US012711576B2

(12) United States Patent
O'Neil et al.

(10) Patent No.: US 12,711,576 B2
(45) Date of Patent: Aug. 18, 2026

(54) NEURAL SUPERSAMPLING AT ARBITRARY SCALE FACTORS

(71) Applicant: Arm Limited, Cambridge (GB)

(72) Inventors: Liam James O'Neil, Bedale (GB); Joshua James Sowerby, London (GB); Yanxiang Wang, Manchester (GB); Matthew James Wash, Stapleford (GB)

(73) Assignee: Arm Limited, Cambridge (GB)

( * ) Notice: Subject to any disclaimer, the term of this patent is extended or adjusted under 35 U.S.C. 154(b) by 235 days.

(21) Appl. No.: 18/473,888

(22) Filed: Sep. 25, 2023

(65) Prior Publication Data

US 2025/0104188 A1 Mar. 27, 2025

(51) Int. Cl.

*G06T 3/4053* (2024.01)
*G06T 3/4007* (2024.01)
*G06T 3/4046* (2024.01)
*G06T 5/50* (2006.01)

(52) U.S. Cl.

CPC .......... *G06T 3/4053* (2013.01); *G06T 3/4007* (2013.01); *G06T 3/4046* (2013.01); *G06T 5/50* (2013.01); *G06T 2207/20016* (2013.01); *G06T 2207/20081* (2013.01); *G06T 2207/20084* (2013.01); *G06T 2207/20212* (2013.01)

(58) Field of Classification Search

None

See application file for complete search history.

(56) References Cited

U.S. PATENT DOCUMENTS

2020/0126191 A1* 4/2020 Munkberg ................ G06T 5/70
2020/0126192 A1* 4/2020 Munkberg ........... G06N 3/0464
2022/0114701 A1* 4/2022 Liu ...................... H04N 23/951
2023/0274395 A1* 8/2023 O'Neil .................. G06N 3/084
345/611

OTHER PUBLICATIONS

Burnes, "Nvidia DLSS 2.0: A Big Leap in AI Rendering," https://www.nvidia.com/en-us/geforce/news/nvidia-dlss-2-0-a-big-leap-in-ai-rendering/, Mar. 23, 2020, 9 pages.

(Continued)

*Primary Examiner* — Jiangeng Sun

(74) *Attorney, Agent, or Firm* — Berkeley Law & Technology, LLP

(57) ABSTRACT

A first image frame in a first resolution format comprising image signal intensity values mapped to first pixel locations has sampling points offset from the centers of first pixel locations according to associated jitter vectors. The image signal intensity values are mapped to second pixel locations in a second image frame in a second resolution format based at least in part on the jitter vectors, the second resolution format being higher resolution than the first resolution format. The mapped image signal intensity values are combined with image signal intensity values of an accumulated history image buffer according to coefficients predicted by a neural network such as based on magnitudes of the jitter vectors. Interpolated pixel image intensities are added to the accumulated history buffer for empty or null pixel locations in the second image frame in the second image format. Upsampling artifacts such as checkerboarding and aliasing are reduced.

20 Claims, 8 Drawing Sheets

(56) References Cited

OTHER PUBLICATIONS

Yang, et al, "A Survey of Temporal Antialiasing Techniques," Eurographics 2020, vol. 39 (2020), No. 2, https://onlinelibrary.wiley.com/doi/epdf/10.1111/cgf.14018, Jul. 13, 2020, 15 pages.
Fidelity, 'FidelityFX-FSR2, https://github.com/GPUOpen-Effects/FidelityFX-FSR2,' Jan. 2023, 5 pages.
Fidelity, "FidelityFX Super Resolution 2.2 (FSR 2.2.1)," https://www.google.com/search?client=firefox-b-1-d&q=FidelityFX+Super+Resolution+2.2+%28FSR+2.2.1%29, Jan. 2023, 64 pages.
Burnes, "From Nvidia DLSS 2.3 To Nvidia Image Scaling: Nvidia's Full Stack of Scaling Solutions for Gamers" Nov. 16, 2021, 19 pages.
Application as filed, U.S. Appl. No. 17/816,655, filed Aug. 1, 2022, 97 pages.

* cited by examiner

NEURAL SUPERSAMPLING AT ARBITRARY SCALE FACTORS

FIELD

The field relates generally to scaling a rendered image, and more specifically to neural supersampling a rendered image at arbitrary scale factors.

BACKGROUND

Rendering images using a computer has evolved from low-resolution, simple line drawings with limited colors made familiar by arcade games decades ago to complex, photo-realistic images that are rendered to provide content such as immersive game play, virtual reality, and high-definition CGI (Computer-Generated Imagery) movies. While some image rendering applications such as rendering a computer-generated movie can be completed over the course of many days, other applications such as video games and virtual reality or augmented reality may entail real-time rendering of relevant image content. Because computational complexity may increase with the degree of realism desired, efficient rendering of real-time content while providing acceptable image quality is an ongoing technical challenge.

Producing realistic computer-generated images typically involves a variety of image rendering techniques, from rendering perspective of the viewer correctly, rendering different surface textures, and providing realistic lighting. But rendering an accurate image takes significant computing resources, and becomes more difficult when the rendering must be completed many tens to hundreds of times per second to produce desired framerates for game play, augmented reality, or other applications. Specialized graphics rending pipelines can help manage the computational workload, providing a balance between image quality and rendered images or frames per second using techniques such as taking advantage of the history of a rendered image to improve texture rendering. Rendered objects that are small or distant may be rendered using fewer triangles than objects that are close, and other compromises between rendering speed and quality can be employed to provide the desired balance between frame rate and image quality.

In some embodiments, an entire image may be rendered at a lower resolution than the eventual display resolution, significantly reducing the computational burden in rendering the image. Even with such techniques, the number of triangles that may be rendered per image while maintaining a reasonable frame rate for applications such as gaming or virtual/augmented reality may be significantly lower than the display resolution of a modern smartphone, tablet computer, or other device. This may result in a rendered image in which contains an upsampled image that has resolution scaling or upsampling artifacts, or includes other imperfections as a result of such constraints on the number of calculations that can be performed to produce each image. For reasons such as these, it is desirable to manage image artifacts in rendered images, such as during real-time rendered image streams.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

DETAILED DESCRIPTION

Figure 1:
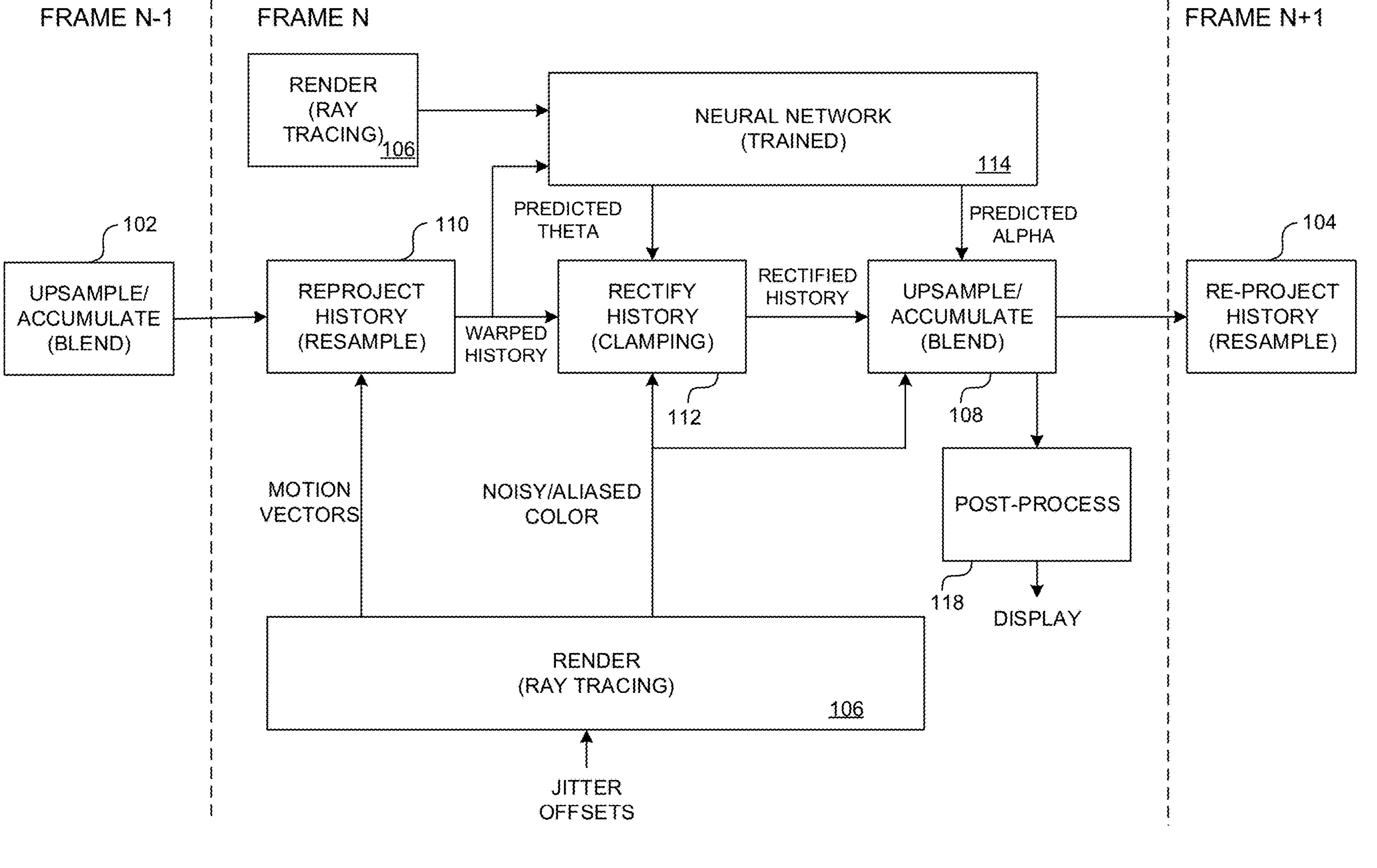
FIG. 1 is a block diagram of a graphics rendering pipeline, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As graphics processing power available to smart phones, personal computers, and other such devices continues to grow, computer-rendered images continue to become increasingly realistic in appearance. These advances have enabled real-time rendering of complex images in sequential image streams, such as may be seen in games, augmented reality, and other such applications, but typically still involve significant constraints or limitations based on the graphics processing power available. For example, images may be rendered at a lower resolution than the eventual desired display resolution, with the render resolution based on the desired image or frame rate, the processing power available, the level of image quality acceptable for the application, and other such factors.

Rendering images at a lower resolution than the display resolution can significantly reduce the computational burden of rendering sequential images in real time, enabling even relatively low power devices such as smartphones to display complex rendered graphics at frame rates that provide for engaging game play or that are suitable for other graphics applications such as augmented reality. For example, an image rendered at 1000×500 pixels that is subsequently scaled and displayed on a 2000×1000 pixel display may be scaled using a scale factor of 2×2, resulting in approximately a quarter the computational workload for the rendering unit relative to rendering a full-scale image. Larger scale factors such as 3×3 result in higher framerates given the lower number of pixels to shade in rendering each image, but consequently result in lower detail and resolution in each rendered image. Smaller scale factors such as 1.5×1.5 result in lower framerates but higher image detail than larger scale factors, and consume more computing resources and power to render. The scale factor in some examples may be tunable, enabling the user, the software, or another such means to select an acceptable compromise between frame rate and image quality or detail.

Scale factors on desktop devices often are based on typical standardized display resolutions such as 1920×1080 and 3840×2160 (or 4k), most often at a 16×9 aspect ratio. Preselected rendering presets such as 1.5×1.7×, 2×, and 3× scaling of the rendered image to achieve the standardized display resolution are therefore typically provided to the consumer, using text descriptors that are easy to understand such as "quality," "balanced," "performance," and "ultra performance." But there is significantly greater variation in mobile devices for display resolution, aspect ratio, and image processing power, and use of pre-selected rendering resolutions based on such scale factors and anticipated display resolution is less feasible. Upscaling algorithms such as supersampling algorithms used to upscale rendered image sequences in smartphones and tablets are therefore likely to support a broad range of scale factors, including non-integer scale factors, to provide the best compromise between rendering image rate (or frame rate) and rendered image resolution or detail. But, supporting arbitrary scale factors in an upscaler such as a supersampling upscaler in mobile devices may result in scaling artifacts such as checkerboarding, aliasing, and the like, noticeably degrading the appearance of the upscaled image.

Some examples presented herein therefore provide for improved upscaling at arbitrary scale factors, such as by mapping pixel values in a lower resolution rendered image offset by jitter vectors to a higher resolution using the jitter values. In a further example, a warped history frame may be combined with the higher resolution upscaled image using an alpha (α) value predicted by a neural network, with the warped history frame in a more detailed example being the same resolution as the higher resolution upscaled image.

The mapped signal intensity values may in some examples be scaled based on a length of the jitter vectors, such that longer jitter vectors farther from the pixel center are less heavily weighted than signal intensity values having short jitter vectors that place the signal intensity values closer to the pixel centers. The resulting higher resolution upscaled image mapped from the lower resolution image may in some examples be a sparse image, having empty pixel locations. These empty pixel locations may in various examples be derived or filled by interpolating between the mapped image signal intensity values in nearby upscaled image pixel locations and image signal intensity values of a warped history image frame.

Methods such as these facilitate upscaling or mapping a first lower resolution image to a second higher resolution by arbitrary, non-integer scale factors while reducing artifacts such as checkerboarding, aliasing, and the like. The second higher resolution image may be a displayed image frame matching the display resolution of a computerized device in some examples, and the second higher resolution image or displayed image may be added to the warped history image frame in various examples to generate a new warped history image frame.

FIG. 1 is a block diagram of a graphics rendering pipeline, consistent with an example embodiment. FIG. 1 shows generally on the left side production of image frame FRAME N−1 for a previous rendering instance, including an image frame 102 comprising an accumulated history. A center portion of FIG. 1 shows components to produce an image frame FRAME N for a current rendering instance. A portion on the right of FIG. 1 shows an output from the current rendering instance as re-project history block 104 to be processed in a subsequent (e.g., future) rendering instance to produce an image frame FRAME N+1.

Rendering module 106 may employ rendering and ray tracing to produce a current image frame FRAME N, using jitter offsets and other such inputs for example. The rendered image frame may be rendered at a lower resolution than a desired display resolution, and in a further example may be rendered at a non-integer scale factor such as where the desired display resolution may be 1.4×, 1.7×, or 2.3× the rendered image resolution. The rendered image frame at instance N may be provided (for objects or textures in image frame FRAME N relative to rendering instance N−1) to the upsample/accumulate block 108 for upsampling such as by using a supersampling upscaling algorithm before using processes such as resampling and rectification to combine the rendered image with information from historical rendered images. The supersampling upscaler in a more detailed example may be operable to map pixel values in a lower resolution rendered image offset by jitter vectors to a higher resolution using the jitter values, and in a further example the mapped signal intensity values may be scaled based on a length of the jitter vectors such that shorter jitter vectors closer to pixel centers are weighted more heavily than pixel values associated with long jitter vectors. The supersampling upscaler 108 may generate a sparse image having empty pixel locations, which be filled by interpolating between the mapped image signal intensity values in nearby upscaled image pixel locations and/or image signal intensity values of a warped history image frame. The supersampling upscaler in block 108 in this example is further combined with an accumulated history buffer, and may blend the upsampled image of Frame N with the accumulated history to update the accumulated history buffer. More detailed embodiments of upscaling are described in other embodiments described herein.

Motion vectors from the rendered image may be provided to reproject history block 110, which may receive both motion vectors from FRAME N referenced to a current rendering instance and an accumulated image history output at 102 referenced to a previous rendering instance. Reproject history block 110 may re-project or warp the accumulated image history output onto the current rendered image, such as by using rendered or estimated motion vectors from render block 106 or another source. This may serve to align pixel values of an output image frame from a previous rendering instance with pixel values of the upscaled image frame in a current rendering instance.

Rectify history block 112 may use the warped or pixel-aligned version of the past image frame to mitigate effects of image content being disoccluded or becoming visible in the current image frame FRAME N that were not visible in the prior image frame FRAME N−1, such as by reducing or clamping the influence of accumulated historic image frames on the disoccluded pixels in the current image frame. In a further example, rectification or history invalidation may also be performed for changes in view-dependent lighting, such as where the camera's current view direction has changed sufficiently from a prior image's point of view to render specular highlight and/or reflection detail invalid between image frames.

Rectify history block 112 may also receive predicted blending coefficients "theta" such as from trained neural network 114 to predict or estimate the degree to which the warped history is to be added to the current rendered frame. The resulting rectified history output from block 112 may therefore comprise a combination of accumulated image history as well as some "clamped" pixels from a current rendered image, such as at locations where pixels become disoccluded in image frame FRAME N.

Upsample/accumulate history block 108 in some examples may selectively combine a re-projected, rectified history received from rectify history block 112 with a current upsampled image frame based on a rendered image received from 106. An accumulation process at accumulate history block 108 may use a parameter "alpha" received from trained neural network 114 to determine a proportion of the current noisy image frame to be blended with the re-projected, rectified history.

Output from upsample/accumulate history block 108 may be provided to post-processing block 118, which may perform various filtering and/or processing functions to form an output image for display. The accumulated or blended image output from upsample/accumulate block 108 may also be stored or provided for processing the next image frame, as reflected by re-project history block 104 (corresponding to the current frame's re-project history block 110, which similarly receives prior frame accumulated image history from accumulate block 102). The example architecture of FIG. 1 may be used to provide significant advantages over current state-of-the-art approaches to upscaling a rendered image before displaying the image, providing improved support for arbitrary non-integer scale factors and reduced image artifacts such as checkerboarding and aliasing in the displayed image.

Figure 2:
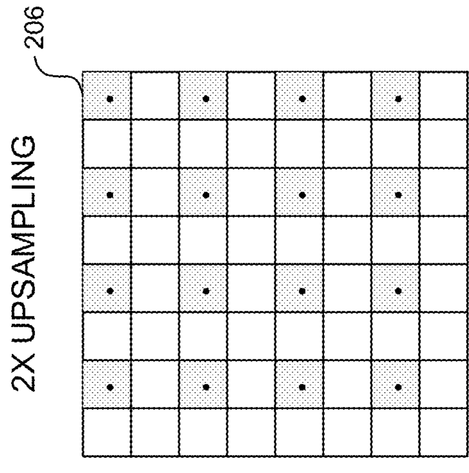
FIG. 2 is a diagram showing upsampling a rendered image to higher resolution using jitter, consistent with an example embodiment.
Figure 2:
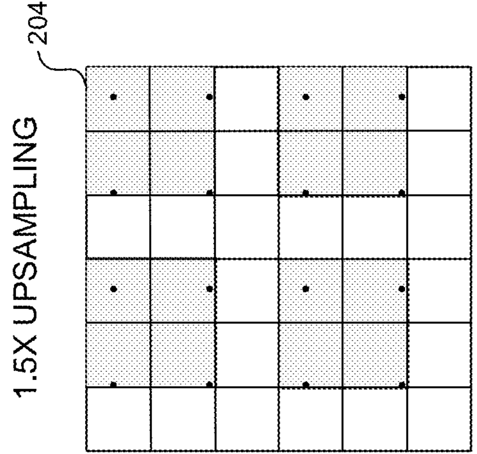
Figure 2:
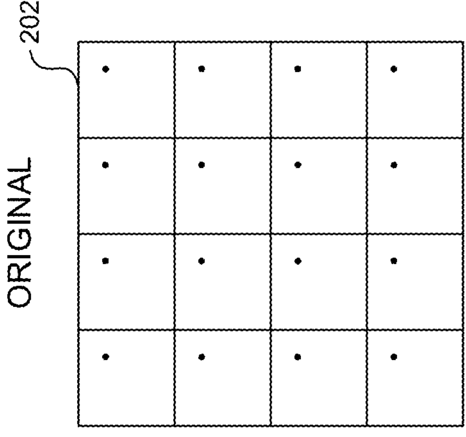

FIG. 2 is a diagram showing upsampling a rendered image to higher resolution using jitter, consistent with an example embodiment. At 202, the original rendered image is shown. A sampling point deviating from the center of each pixel location by a jitter vector amount is also shown, which in the example image frame shown at 202 is upward and to the right of the center of each pixel of the rendered image. If this image was not upscaled but was directly recorded in a history buffer such as the accumulate buffers of the example shown in FIG. 1, one sample would be accumulated per history buffer pixel. But, when the original rendered image shown at 202 is upsampled, the resulting sampling patterns result in less than one sample per history buffer pixel or per upsampled image, and so may show artifacts such as checkerboarding, aliasing, and other artifacts depending in part on the upsampling ratio.

An upsampled image with 1.5× the resolution of the original image shown at 202 is shown at 204, with the jitter-derived sampling points shown in the original image at 202 mapped to the corresponding locations in the upsampled image. The pixels in the upsampled image that include a sampling point tend to cluster when non-integer upsampling ratios such as 1.5× upsampling are used, forming a checkerboard in the example shown at 204 as denoted by the shaded boxes which contain the mapped sampling points. The empty pixel locations shown at 204 do not contain a sampling point from the original image 202, and in some examples may be filled by interpolation, image history, or by a combination of interpolation and history or other such means. The 2× upsampled image shown at 206 illustrates how integer upsampling ratios result in a more uniform distribution of pixels with sampling points within the upsampled image, alleviating some scaling artifacts visible in the 1.5× upsampling example shown at 204 that are more common in non-integer upsampling ratios. Some artifacts such as checkerboarding may also be more visible with bigger upsampling factors, e.g. 4× upsampling may show stronger checkerboarding artifacts than 2× upscaling or 1.5× upsampling.

The 1.5× upsampled image shown at 204 illustrates another problem with traditional upscaling algorithms in that sample points very near the edge of upsampled pixels in 204 dictate the color or shading of the entire pixel in which the sampling point resides, but have no influence on neighboring pixels, some of which may be a tiny fraction of a pixel width away from the sampling point and some of which may not have a sampling point located within (i.e., may be empty). Further, because the upsampled pixels shown at 204 span multiple original pixels shown at 202, the upsampled pixels cannot be accurately mapped back to the original image without further information such as separately retaining the sampling points used or other such original image information.

Figure 3:
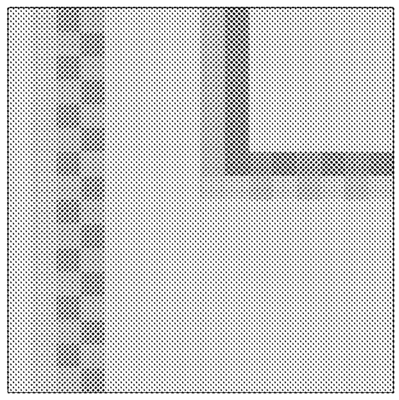
FIG. 3 is a rendered image upscaled at 1.5×, consistent with an example embodiment.

FIG. 3 is a rendered image upscaled at 1.5×, consistent with an example embodiment. The image shown in FIG. 3 further demonstrates how upsampling at a non-integer ratio can result in an upsampled image having checkerboarding, stair-stepping, aliasing, and other artifacts generated as a function of the upsampling ratio. Fine details such as lines show up as alternating dark and light pixels in the image of FIG. 3, while somewhat larger lines show up as a checkerboard of alternating dark and light pixels. Large upsampling ratios such as 3× or 4× upsampling may exhibit greater checkerboarding artifacts than smaller upsampling ratios such as 1.5× or 2×, and patterns near the sampling frequency may similarly have visible aliasing patterns, moiré patterns, and other visible sampling patterns or effects not in the original rendered image.

Figure 4:
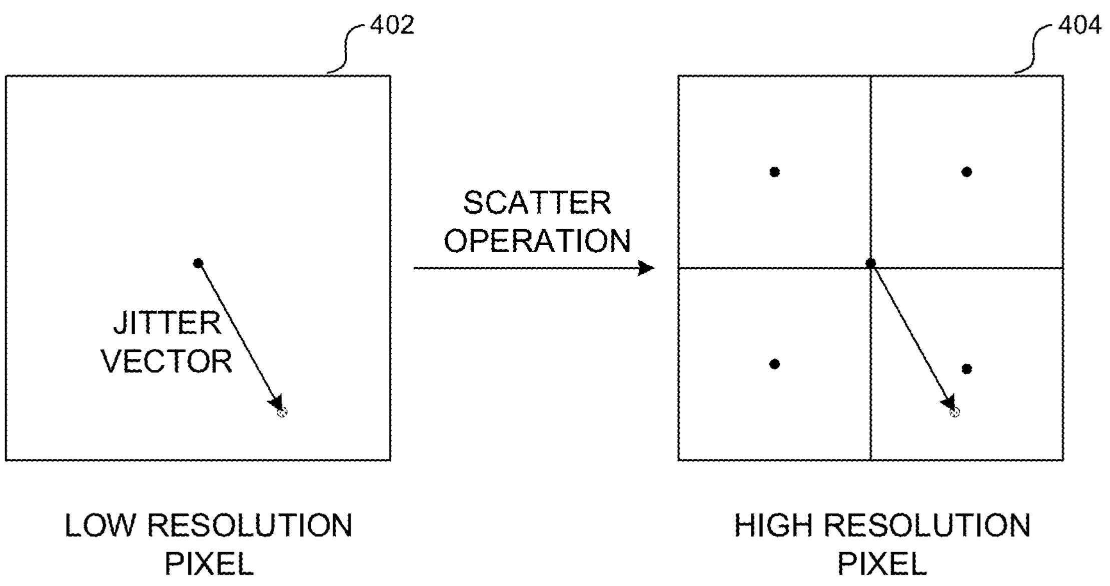
FIG. 4 shows a more detailed upsampling process, consistent with an example embodiment.

FIG. 4 shows a more detailed upsampling process, consistent with an example embodiment. At 402, a low resolution pixel from a rendered image is shown, including a dark dot marking the center of the pixel. A jitter vector denoted by a line with an arrow represents an offset from the center of the pixel at which the rendered image's color or intensity will be sampled, which in a further example may be applied to each pixel in the low resolution rendered image frame. The sampling point in the example of 402, as altered by the jitter vector, is represented by a gray dot. In a further example, jitter vectors vary from image frame to image frame, ensuring some effective movement of the camera between image frames even when there are stationary objects in the image frame. Repeated variation of the jitter vectors between image frames along with blending the current image frame with a history buffer helps reduce aliasing, checkerboarding, stair stepping, and other sampling artifacts that may otherwise be more visible in the rendered image.

A scatter operation places the sampling point from the low resolution pixel shown at 402 into a high resolution pixel shown at 404. This example is consistent with the 2× upsampling scaling factor shown at 206 of FIG. 2, but provides more detail in using jitter vectors to scatter sampling points in the upsampled image. The high resolution pixel has a sampling point in only one of four high resolution pixels shown, and comprises a part of a sparse image. The high resolution pixel and corresponding high resolution image may be used to update the history buffer, and in further examples may have an effect on the history buffer that varies with factors such as recent disocclusion of the pixel. As the upscaling factor increases, the scatter operation shown may have increasingly visible image artifacts, due to factors such as the jittered and scattered sampling points occupying an increasingly small percentage of high resolution pixels.

In a more detailed example, the low resolution coordinate position of the sampling point as shown at 402 can be translated to the sampling point's corresponding pixel in the high resolution pixel shown at 404 using expression [1] as follows:

$$hrCoord(x, y) = \text{floor}((lrCoord(x, y) + 0.5 + \text{jitter}) \times \text{scale}) \quad [1]$$

where:

hrCoord(x,y) is the (x,y) coordinate position of the pixel sampling point in the high resolution image;

floor is a function returning the greatest integer less than the input, here yielding the integer coordinates or pixel location of the sampling point in the high resolution image;

lrCoord(x,y) is the (x,y) coordinate position of the top left corner of the pixel (integer position) in the low resolution image;

jitter is the offset from the center of a low resolution pixel to the low resolution pixel's sampling point; and scale is the scale factor between the low resolution and high resolution pixels and images, and may be different values for height and width of a two-dimensional image.

Once the pixel location of the sampling point in the high resolution image is obtained such as by using the above equation, the sample may be written sparsely into the high resolution image using expression [2] as follows:

$$\text{output}(hrCoord(x, y)) = \text{input}(lrCoord(x, y)) \quad [2]$$

where:

hrCoord(x,y) is the (x,y) coordinate position of the pixel sampling point in the high resolution image;

lrCoord(x,y) is the (x,y) coordinate position of the top left corner of the pixel (integer position) in the low resolution image;

input is the input sample read from the sampling point in the low resolution image; and output is the output sample written into the pixel location in the high resolution image.

The resulting high resolution image, having each low resolution pixel's sampling point intensity or color value written into a corresponding pixel location in the high resolution image results in a sparse high resolution pixel in which no collisions (or low resolution pixel sampling locations written into the same high resolution pixel location) if the same jitter vector is used to sample all pixels in the low resolution image because there are always fewer low resolution sampling points (or pixels) than there are pixel locations in the high resolution image.

The sparse high resolution image constructed by upsampling according to expressions [1] and [2] and as shown in FIG. 4 can then be written into a history buffer, and an alpha parameter may control the degree to which the pixels in the upsampled image contribute to the corresponding pixel locations within the rectified warped history buffer. A larger alpha and a larger contribution having a greater effect on the history buffer may be desirable when the pixel location has recently become disoccluded and there is little relevant pixel history, while a smaller alpha and corresponding smaller contribution of the pixel value on the history buffer may be desirable when the pixel location has a robust history and is approaching or converging upon a stable value. The alpha value may therefore be considered a complex function of the convergence level and the recency of a reset event such as a disocclusion, and in a further example may be predicted by a trained neural network. The process of combining a current high resolution image frame with a warped history buffer may be performed using expression [3] as follows:

$$\text{out}(x, y) = lerp(warpedHistory(x, y), sparseSamples(x, y), \text{alpha}(x, y) \times \text{mask}(x, y) \quad [3]$$

where:

out(x,y) is a pixel value at pixel location x,y in a blended output image;

lerp(a,b,c) is a linear interpolation function that interpolates to a position between the first two arguments a and b specified by a third argument C, with the variable C in this example being between or equal to zero and one;

warpedHistory(x,y) is a pixel value at pixel location x,y in the accumulated image stored in the warped history buffer;

sparseSamples(x,y) is a pixel value at pixel location x,y in the upscaled sparse high resolution image comprising pixel values derived from a low resolution rendered image;

alpha(x,y) is the alpha or blending value that specifies the degree to which the pixels in the upsampled sparseSamples(x,y) image contribute to the corresponding pixel locations within the warped history buffer; and mask(x,y) is a mask having a value of one where the upsampled sparseSamples(x,y) image contains a valid pixel value mapped from the low resolution rendered image and zero where the upsampled image does not contain a pixel value mapped from the low resolution rendered image.

Because the methods discussed above in conjunction with FIG. 4 may result in image artifacts such as checkerboarding, aliasing, stair stepping, and the like due at least in part to the nature of upsampling at arbitrary non-integer values, the pixel values in the upscaled high resolution image in some examples may be further weighted based on factors such as jitter vector length or the distance of the pixel sampling point from the center of the pixel.

Figure 5:
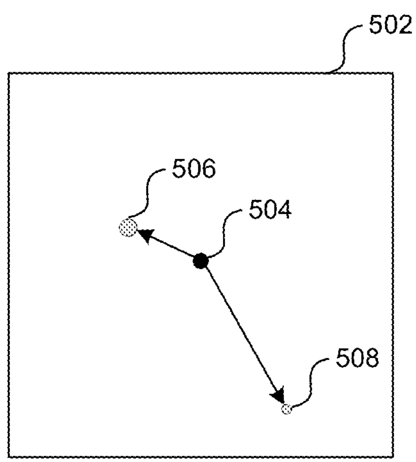
FIG. 5 shows use of jitter vector length of a pixel sample to weight the pixel sample's contribution to an accumulated image history buffer, consistent with an example embodiment.

FIG. 5 shows use of jitter vector length of a pixel sample to weight the pixel sample's contribution to an accumulated image history buffer, consistent with an example embodiment. The pixel shown at 502 of FIG. 5 shows a black dot 504 at the center of the pixel, which is the point from which a jitter vector is derived. Two example sampling points are also shown, including a sampling point 506 that is relatively near the center 504 and a sampling point 508 that is relatively far from the sampling point 504. The distance and direction from the center 504 to the relatively near sampling point 506 is represented by a jitter vector shown as a line and an arrow, such that the jitter vector comprises both direction and distance values describing the path from the center 504 to the sampling point 506. The jitter vector shown as a line and arrow representing the direction and distance from the center 504 to the relatively far sampling point 508 has a distance more than double the distance of the jitter vector associated with sampling point 506.

The jitter vector's length therefore varies with the distance from the center of the pixel to the sampling point, and is inversely proportional to the degree to which the sampling point is likely to represent the image color or intensity value of a sampling point taken at the center 504 of the pixel. Because sampling points with jitter vector lengths that are relatively long (e.g., approaching 7× the pixel height and width) are much less likely to represent the average value sampling points within the pixel than samples taken near the center 504, jitter vector lengths may be used to scale the contribution of sampling points to an accumulated history buffer such as the accumulate (blend) accumulated history buffer shown at 102 and 116 of FIG. 1.

In a more detailed example, a jitter scale value may be calculated using expression [4] as follows:

$$jitterScale = lerp\left(1.0,\ MinScale,\ \frac{\text{length(jitter)}}{\text{length}(maxJitter)}\right) \quad [4]$$

where:

jitterScale is the amount by which the sampling point should be scaled, and is primarily dependent on the jitter vector length;

lerp(a,b,c) is a linear interpolation function that interpolates to a position between the first two arguments a and b specified by a third argument C, with the variable C in this example being between or equal to zero and one;

MinScale is a minimum scale value for the jitterScale output value, and may be a tunable image quality parameter;

length(jitter) is the length of the jitter vector; and length(maxJitter) is the maximum possible length of a jitter vector.

Expression [4] therefore uses linear interpolation to pick a jitterScale scaling value between 1 and MinScale to be applied to the sampling point before adding it to the accumulated history. The scaling value is derived by linear interpolation between 1 and MinScale, based on the jitter vector length's length relative to the maximum possible jitter length. Although the jitterScale scaling value in this example varies linearly with the jitter vector length from the center of the pixel to the sampling point, other examples may use non-linear functions such as gaussian functions, exponential functions, or the like to derive the scaling value from jitter vector length.

Figure 6:
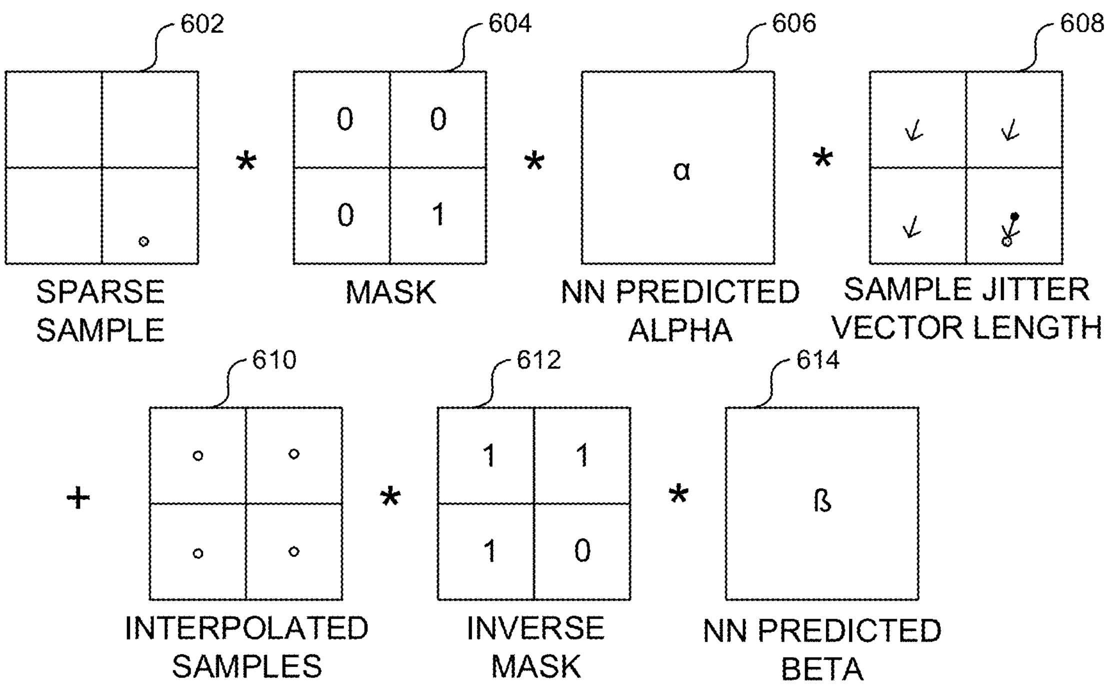
FIG. 6 shows blending an interpolated pixel value into empty pixels in a sparse upscaled image, consistent with an example embodiment.

In another example, upsampling artifacts such as checkerboarding, aliasing, and the like may be mitigated by filling empty pixels in the upscaled image with interpolated pixel values. By blending in samples interpolated from the sparse samples in the upscaled image, the sparse samples mapped to the upscaled image may help smooth upsampling artifacts in neighboring upsampled pixel locations. FIG. 6 shows blending an interpolated pixel value into empty pixels in a sparse upscaled image, consistent with an example embodiment.

At 602, a sparse sample is mapped into an upscaled image, such that the sparse sample occupies only the lower right upsampled image pixel. The other three pixel locations are unoccupied and do not contain sampling points, and so the upsampled image is deemed to be sparse (i.e., not filled with pixel sample values). This sparse sample is masked at 604 using a mask having a one value in only pixel locations that contain a sampling point, and the resulting masked upscaled image is multiplied by a predicted alpha or blending value shown at 606 and a sample jitter vector length shown at 608 (and as described in the example of FIG. 5). The sparse sample is therefore masked, multiplied by the alpha value predicted by a neural network for blending into the accumulated history, and scaled by the jitter vector length such that sampling points nearer the center of the pixel are more heavily weighted.

Because empty pixels in the sparse sample shown at 602 are excluded from the result of the process of multiplying the sparse sample 602 with the predicted alpha 606 and jitter vector length 608 by further multiplying them with a mask 604, these empty pixels remain empty after the calculations in the top row of FIG. 6 are completed. The top row of FIG. 6 take alone therefore represents one example implementation of jitter vector scaling as discussed in conjunction with FIG. 5.

The bottom row of FIG. 6 adds interpolated pixel values for empty pixel values based on a predicted beta blending value and an inverse mask, further reducing the effect of upsampling artifacts on an accumulated history buffer and output or displayed image. In a more detailed example, interpolated samples are calculated for at least the empty pixel locations that do not contain a sampling point. An inverse mask shown at 612 is the inverse of mask 604, and ensures that interpolated samples are only included for locations that do not have a sampling point. Once the interpolated sample array is multiplied by the inverse mask 612, it may be multiplied by a beta coefficient (B) such as may be predicted by a trained neural network to determine a degree to which the interpolated samples should be added to the accumulated history buffer in upscaled image pixel locations lacking a sampling point. In a further example, the interpolated samples may also be influenced by a blending coefficient theta such as from the trained neural network 114 of FIG. 1 that predicts the degree to which the warped history is to be added to the current rendered frame. Interpolated samples shown at 610 may be derived in various examples using traditional interpolation algorithms such as bilinear or cubic interpolation algorithms, or may be derived using a trained neural network, a kernel prediction network, or other such interpolation algorithm.

In a further example, blending a portion of the interpolated pixel color values into empty pixels of sparse upscaled images may be calculated using expressions [5] and [6] as follows:

$$accumAlpha(x, y) = lerp(warpedHistory(x, y), sparseSamples(x, y), \text{alpha}(x, y) * \text{mask}(x, y) * jitterScale) \quad [5]$$

where:

- accumAlpha(x,y) is a pixel value at pixel location x,y in a sparse upscaled image blended with an accumulated history by interpolating between an accumulated history warpedHistory and sparse samples sparseSamples by a degree alpha, weighted using the length of the jitter vector jitterScale, and masked using mask(x,y) to include only pixel locations with sampling points;
- lerp(a,b,c) is a linear interpolation function that interpolates to a position between the first two arguments a and b specified by a third argument C, with the variable C in this example being between or equal to zero and one;
- warpedHistory(x,y) is a pixel value at pixel location x,y in a warped accumulated history buffer of past frames of the upscaled image;
- sparseSamples(x,y) are the sparse sample points mapped into an upscaled image from a lower resolution rendered image;
- alpha(x,y) is a blending factor specifying the degree to which sparseSamples(x,y) are to be blended into the warped history to generate the output accumAlpha(x, y);
- mask(x,y) is a mask having a value of one for pixel locations containing sampling points and a zero for empty pixel locations; and
- jitterScale is an amount by which the sampling point should be scaled, and is primarily derived from the jitter vector length.

Expression [5] uses the alpha(x,y) parameter to determine a degree of blending the sparse samples sparseSamples(x,y) into an accumulated history warpedHistory(x,y) to generate an output accumAlpha(x,y). A mask mask(x,y) limits the output to pixel locations having a sampling point, and each sample having a sampling point is further scaled by both alpha(x,y) and a jitterScale derived from jitter vector length or distance from the sampling point to the center of the sparse pixel for each pixel with a sampling point in the upscaled image. Expression [6] shown below uses the accumAlpha(x,y) calculated using expression [5] plus interpolated pixel data and an inverse mask to generate an output including interpolated pixel values where empty pixel values exist in accumAlpha(x,y) as follows:

$$\text{out}(x, y) = lerp(accumAlpha(x, y), Interp(jitteredColor(x, y)), \text{beta}(x, y) \times (1.0 - \text{mask}(x, y))) \quad [6]$$

where:

- outx,y) is a pixel value at pixel location x,y in an output image including both interpolated samples scaled using a predicted beta value and an inverse mask and sparse samples scaled in expression [5];
- lerp(a,b,c) is a linear interpolation function that interpolates to a position between the first two arguments a and b specified by a third argument c, with the variable c in this example being between or equal to zero and one;
- accumAlpha(x,y) is a pixel value at pixel location x,y in a sparse upscaled image blended with an accumulated history calculated in expression [5];
- Interp(jitteredColor(x,y)) is an interpolated pixel value for pixel locations in the sparse upsampled image that do not have sampling points located within the pixel locations;
- beta(x,y) is the amount by which the interpolated pixel values should be blended into the accumulated history buffer; and
- mask(x,y) a mask having a value of one for pixel locations containing sampling points and a zero for empty pixel locations.

Expression [6] uses a linear interpolation function lerp and an inverse mask calculated using mask(x,y) to selectively output accumAlpha(x,y) for pixel locations having sampling points within the pixel locations and interpolated pixel values Interp(jitteredColor(x,y)) scaled by a blending factor, beta(x,y) for pixel locations that are empty or that do not contain sampling points. The output out(x,y) of expression [6] comprises an output that can be added to an accumulated history buffer such as the accumulate (blend) blocks 102 and 116 of FIG. 1, and which may further be used for generating a displayed image as shown at 118 of FIG. 1. The interpolation function Interp may again be a traditional interpolation algorithm such as a bilinear or cubic interpolation algorithm, or may be derived using a trained neural network, a kernel prediction network, or other such interpolation algorithm in various examples.

The processes shown in FIGS. 5 and 6 and as described in the accompanying expressions and other examples show how techniques such as using jitter vector length to scale the ratio of a rendered and upsampled image combined with a warped history buffer to generate a new history and/or a displayed output image can help improve the appearance of upsampling artifacts such as checkerboarding, aliasing, and the like. In another example, empty pixel locations in a sparse upsampled image are filled using interpolation to reduce similar upsampling artifacts. The reduction in visible upsampling artifacts may be particularly noticeable in examples with arbitrary non-integer upsampling ratios, and in upsampling ratios that are particularly large.

Figure 7:
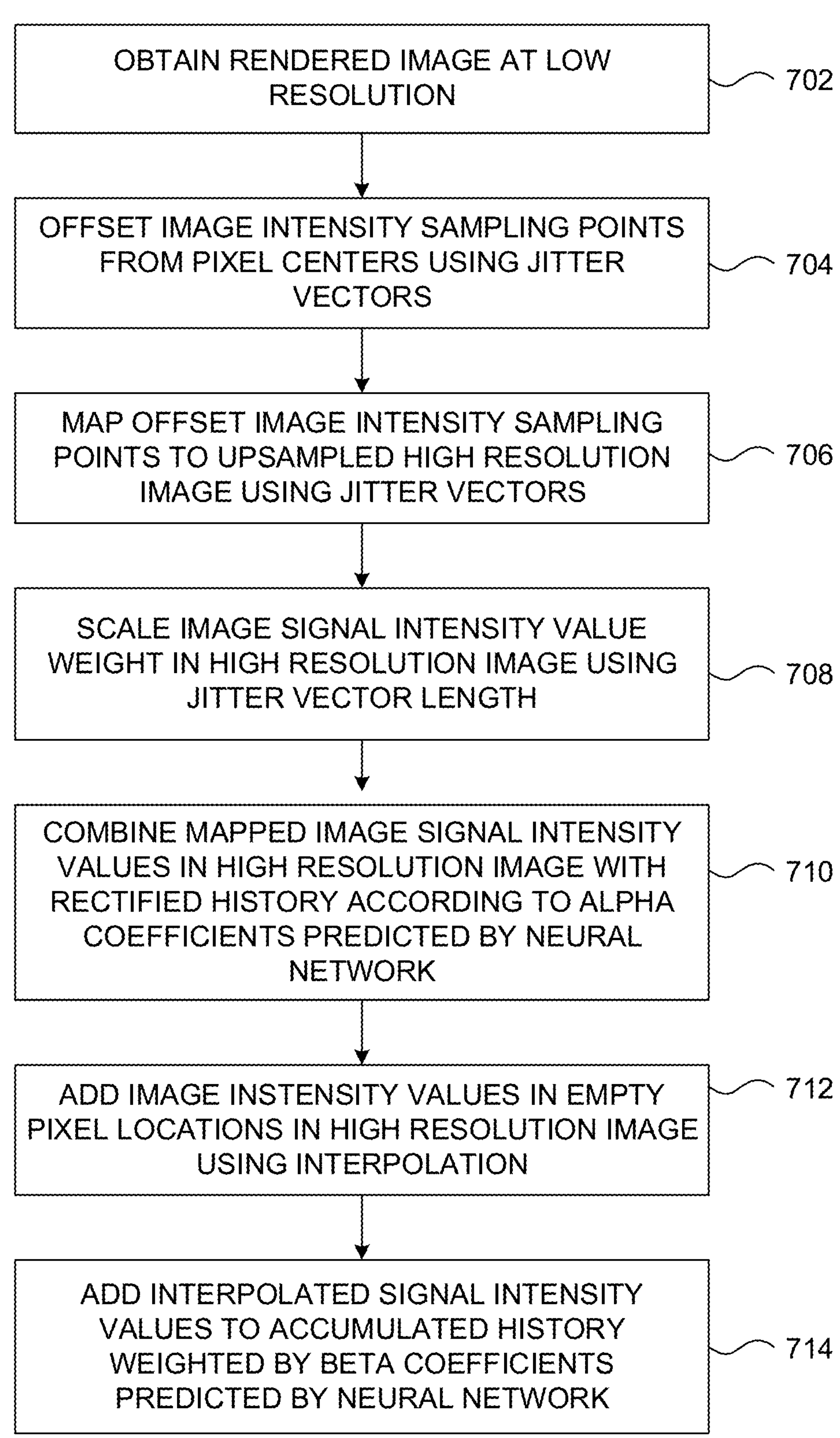
FIG. 7 is a flow diagram of a method of reducing upsampling artifacts in an upsampled rendered image, consistent with an example embodiment

FIG. 7 is a flow diagram of a method of reducing upsampling artifacts in an upsampled rendered image, consistent with an example embodiment. At 702, an image frame in a sequence of image frames is rendered and is obtained for processing. The image in a further example is processed using an accumulated history buffer such as those shown in the examples of FIG. 1, which store an accumulated history of pixel locations that are warped and rectified to the current image frame as described in conjunction with the examples of FIG. 1. The rendered image may be of lower resolution than the desired display resolution, the accumulated history buffer, and/or other versions of the rendered image, such that upscaling the rendered image is desired.

The rendered low resolution image is sampled using sampling points offset from pixel centers of the low resolution image at 704, using jitter vectors that in a further example may be the same for each pixel in an image frame but that may vary between image frames in a rendered image frame sequence. The image sampling points offset by the jitter vectors are mapped to a high resolution image at 706, which in a further example may result in a sparse image having pixel locations that contain an image sampling point and pixel locations that are empty, null, or that do not contain an image sampling point.

The image signal intensity values of the image sampling points are scaled at 708 based on the jitter vector length, such that sampling points having a higher jitter vector length are weighted more heavily than image sampling points having a shorter jitter vector length. This is done to limit the contribution of sampling points far from the center of a pixel to an accumulated history buffer, as sampling points farther from the center of a pixel are less likely to represent the typical signal intensity or color of a pixel than samples taken near the pixel. Using jitter vector length to scale contribution of a sampling point to an accumulated history buffer further helps reduce upsampling artifacts such as checkerboarding, aliasing, stair stepping, and the like. These scaled signal intensity values mapped from the low resolution rendered image are blended with or added to the rectified history at 710, such as by using an alpha coefficient predicted by a trained neural network to determine the degree to which the jitter vector length-scaled signal intensity values should be blended with the accumulated history.

Because the upsampled image is higher resolution than the low resolution rendered image and has a greater number of pixel locations than the rendered image, the upsampled image will be a sparse image having at least some pixel locations that are empty or null and that do not contain an image intensity or color value. At 712, image intensity values are added to these empty or null pixel locations using interpolation of sampled pixel intensity values and/or historic pixel intensity values from the accumulated history buffer, such as using a traditional interpolation method such as bilinear or cubic interpolation or a machine learning interpolation method such as using a neural network or kernel prediction network to perform interpolation. These interpolated pixel values at previously empty or null locations are added to or blended with the accumulated history buffer at 714, with their weight in blending with the accumulated history buffer determined by factors such as beta coefficients predicted by a trained neural network. In a further example, the beta coefficient may vary based on the proximity of one or more nearest sampling points to the interpolated pixel, and based on other such factors. Addition of interpolated pixels to the accumulated history buffer scaled or weighted according to a beta value may further reduce the appearance of rendered image upsampling artifacts such as checkerboarding, aliasing, stair stepping, moiré patterns, and the like.

Although the flow diagram of FIG. 7 shows steps 710 and 714 as separate steps, in some embodiments these steps may be combined such as by combining the jitter vector length scaled mapped pixel sampling values with interpolated image intensity values filling empty or null pixel locations before adding these pixel intensity values to the accumulated history buffer. In a further example, the pixel intensity values added to the accumulated history buffer at 710 and 714 or added together in a single step may be used to produce a displayed image, such as a high resolution image upscaled using a non-integer scaling factor to produce an upsampled image at a resolution based on a mobile device's physical display resolution.

Various parameters in the examples presented herein, such as blending coefficients alpha and beta and other such parameters, may be determined using machine learning techniques such as a trained neural network. In some examples, a neural network may comprise a graph comprising nodes to model neurons in a brain. In this context, a "neural network" means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

In one example embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 8:
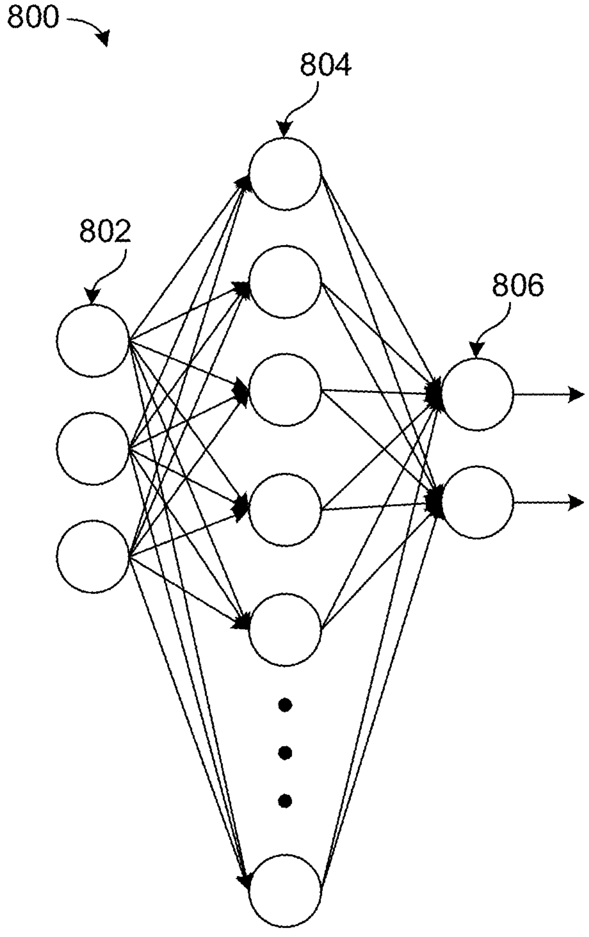
FIG. 8 is a schematic diagram of a neural network, consistent with an example embodiment.

FIG. 8 is a schematic diagram of a neural network 800 formed in "layers" in which an initial layer is formed by nodes 802 and a final layer is formed by nodes 806. All or a portion of features of neural network 800 may be implemented various embodiments of systems described herein. Neural network 800 may include one or more intermediate layers, shown here by intermediate layer of nodes 804. Edges shown between nodes 802 and 804 illustrate signal flow from an initial layer to an intermediate layer. Likewise, edges shown between nodes 804 and 806 illustrate signal flow from an intermediate layer to a final layer. Although FIG. 8 shows each node in a layer connected with each node in a prior or subsequent layer to which the layer is connected, i.e., the nodes are fully connected, other neural networks will not be fully connected but will employ different node connection structures. While neural network 800 shows a single intermediate layer formed by nodes 804, it should be understood that other implementations of a neural network may include multiple intermediate layers formed between an initial layer and a final layer.

According to an embodiment, a node 802, 804 and/or 806 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect.

Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ backpropagation techniques to iteratively update neural network weights to be associated with nodes and/or edges of a neural network based, at least in part on "training sets." Such training sets may include training measurements and/or observations to be supplied as input values that are paired with "ground truth" observations or expected outputs. Based on a comparison of such ground truth observations and associated prediction values generated based on such input values in a training process, weights may be updated according to a loss function using backpropagation. The neural networks employed in various examples can be any known or future neural network architecture, including traditional feed-forward neural networks, convolutional neural networks, or other such networks.

Figure 9:
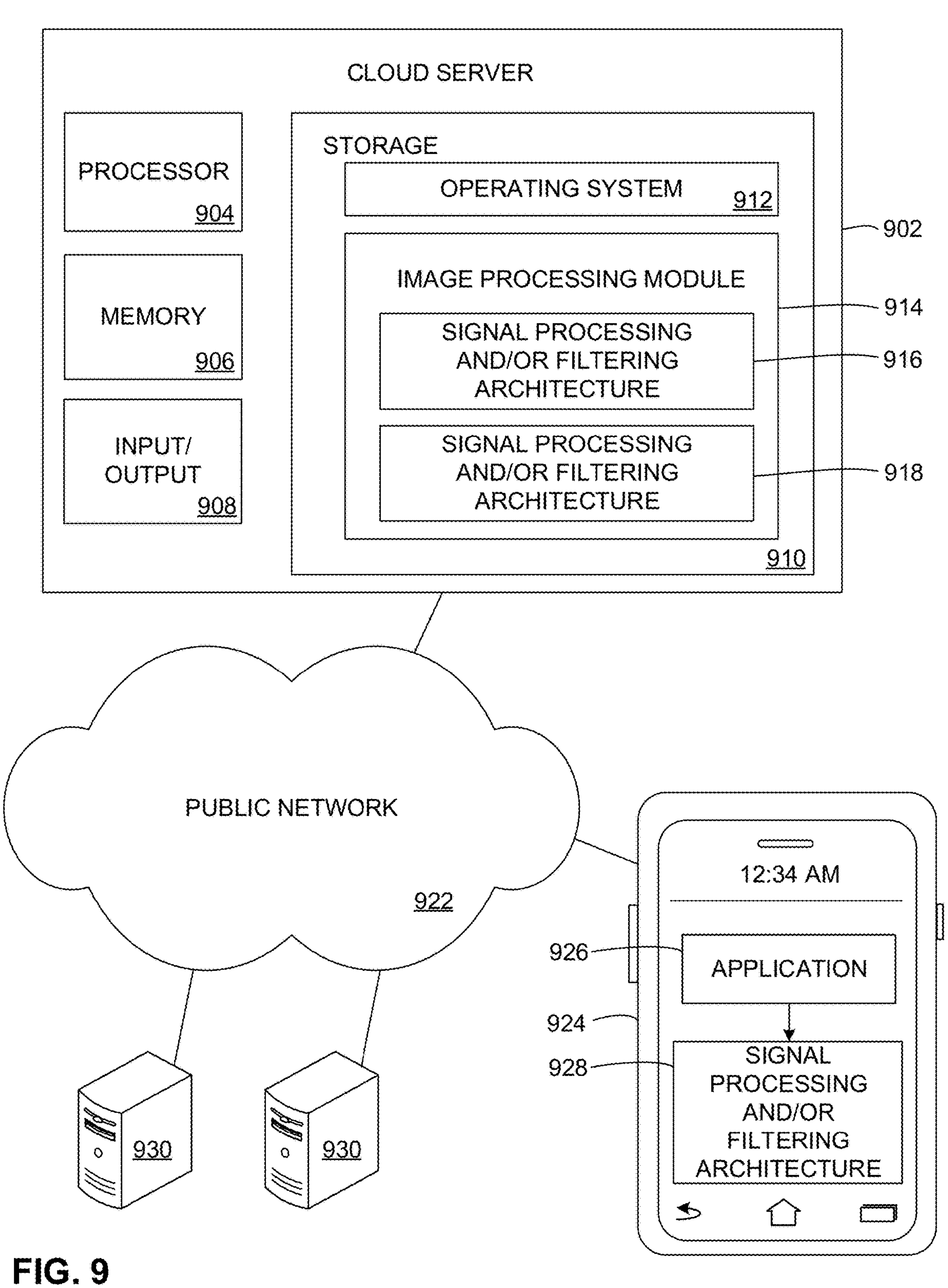
FIG. 9 shows a computing environment in which one or more image processing and/or filtering architectures (e.g., image processing stages, FIG. 1) may be employed, consistent with an example embodiment.

FIG. 9 shows a computing environment in which one or more image processing and/or filtering architectures (e.g., image processing stages, FIG. 1) may be employed, consistent with an example embodiment. Here, a cloud server 902 includes a processor 904 operable to process stored computer instructions, a memory 906 operable to store computer instructions, values, symbols, parameters, etc., for processing on the cloud server, and input/output 908 such as network connections, wireless connections, and connections to accessories such as keyboards and the like. Storage 910 may be nonvolatile, and may store values, parameters, symbols, content, code, etc., such as code for an operating system 912 and code for software such as image processing module 914. Image processing module 914 may comprise multiple signal processing and/or filtering architectures 916 and 918, which may be operable to render and/or process images. Signal processing and/or filtering architectures may be available for processing images or other content stored on a server, or for providing remote service or "cloud" service to remote computers such as computers 930 connected via a public network 922 such as the Internet.

Smartphone 924 may also be coupled to a public network in the example of FIG. 9, and may include an application 926 that utilizes image processing and/or filtering architecture 928 for processing rendered images such as a video game, virtual reality application, or other application 926. Image processing and/or filtering architectures 916, 918, and 928 may provide faster and more efficient computation of effects such as de-noising a ray-traced rendered image in an environment such as a smartphone, and can provide for longer battery life due to reduction in power needed to impart a desired effect and/or compute a result. In some examples, a device such as smartphone 924 may use a dedicated signal processing and/or filtering architecture 928 for some tasks, such as relatively simple image rendering that does not require substantial computational resources or electrical power, and offloads other processing tasks to a signal processing and/or filtering architecture 916 or 918 of cloud server 902 for more complex tasks.

Signal processing and/or filtering architectures 916, 918, and 928 of FIG. 9 may, in some examples, be implemented in software, where various nodes, tensors, and other elements of processing stages (e.g., processing blocks in FIG. 1) may be stored in data structures in a memory such as 906 or storage 910. In other examples, signal processing and/or filtering architectures 916, 918, and 928 may be implemented in hardware, such as a convolutional neural network structure that is embodied within the transistors, resistors, and other elements of an integrated circuit. In an alternate example, signal processing and/or filtering architectures 916, 918 and 928 may be implemented in a combination of hardware and software, such as a neural processing unit (NPU) having software-configurable weights, network size and/or structure, and other such configuration parameters.

Trained neural network 114 (FIG. 1) and other neural networks as described herein in particular examples, may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Computing devices such as cloud server 902, smartphone 924, and other such devices that may employ signal processing and/or filtering architectures can take many forms and can include many features or functions including those already described and those not described herein.

Figure 10:
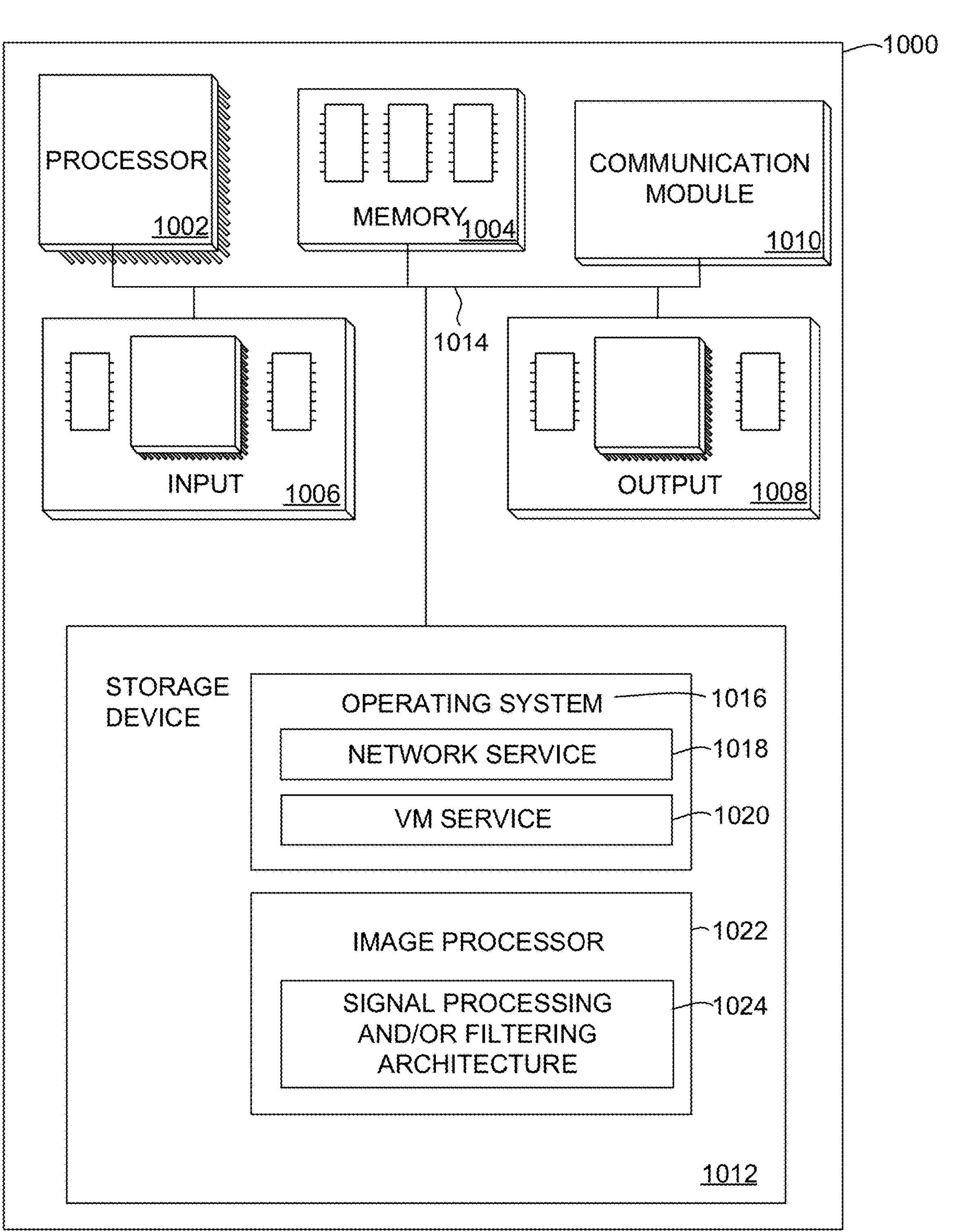
FIG. 10 shows a block diagram of a general-purpose computerized system, consistent with an example embodiment Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

FIG. 10 shows a block diagram of a general-purpose computerized system, consistent with an example embodiment. FIG. 10 illustrates only one particular example of computing device 1000, and other computing devices 1000 may be used in other embodiments. Although computing device 1000 is shown as a standalone computing device, computing device 1000 may be any component or system that includes one or more processors or another suitable computing environment for executing software instructions in other examples, and need not include all of the elements shown here.

As shown in the specific example of FIG. 10, computing device 1000 includes one or more processors 1002, memory 1004, one or more input devices 1006, one or more output devices 1008, one or more communication modules 1010, and one or more storage devices 1012. Computing device 1000, in one example, further includes an operating system 1016 executable by computing device 1000. The operating system includes in various examples services such as a network service 1018 and a virtual machine service 1020 such as a virtual server. One or more applications, such as image processor 1022 are also stored on storage device 1012, and are executable by computing device 1000.

Each of components 1002, 1004, 1006, 1008, 1010, and 1012 may be interconnected (physically, communicatively, and/or operatively) for inter-component communications, such as via one or more communications channels 1014. In some examples, communication channels 1014 include a system bus, network connection, inter-processor communication network, or any other channel for communicating data. Applications such as image processor 1022 and operating system 1016 may also communicate information with one another as well as with other components in computing device 1000.

Processors 1002, in one example, are configured to implement functionality and/or process instructions for execution within computing device 1000. For example, processors 1002 may be capable of processing instructions stored in storage device 1012 or memory 1004. Examples of processors 1002 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 1012 may be configured to store information within computing device 1000 during operation. Storage device 1012, in some examples, is known as a computer-readable storage medium. In some examples, storage device 1012 comprises temporary memory, meaning that a primary purpose of storage device 1012 is not long-term storage. Storage device 1012 in some examples is a volatile memory, meaning that storage device 1012 does not maintain stored contents when computing device 1000 is turned off. In other examples, data is loaded from storage device 1012 into memory 1004 during operation. Examples of volatile memories include random access memories (RAM), dynamic random access memories (DRAM), static random access memories (SRAM), and other forms of volatile memories known in the art. In some examples, storage device 1012 is used to store program instructions for execution by processors 1002. Storage device 1012 and memory 1004, in various examples, are used by software or applications running on computing device 1000 such as image processor 1022 to temporarily store information during program execution.

Storage device 1012, in some examples, includes one or more computer-readable storage media that may be configured to store larger amounts of information than volatile memory. Storage device 1012 may further be configured for long-term storage of information. In some examples, storage devices 1012 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication modules 1010. Computing device 1000 in one example uses communication module 1010 to communicate with external devices via one or more networks, such as one or more wireless networks. Communication module 1010 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 1000 uses communication module 1010 to wirelessly communicate with an external device such as via public network 922 of FIG. 9.

Computing device 1000 also includes in one example one or more input devices 1006. Input device 1006, in some examples, is configured to receive input from a user through tactile, audio, or video input. Examples of input device 1006 include a touchscreen display, a mouse, a keyboard, a voice responsive system, video camera, microphone or any other type of device for detecting input from a user.

One or more output devices 1008 may also be included in computing device 1000. Output device 1008, in some examples, is configured to provide output to a user using tactile, audio, or video stimuli. Output device 1008, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD or OLED), or any other type of device that can generate output to a user.

Computing device 1000 may include operating system 1016. Operating system 816, in some examples, controls the operation of components of computing device 1000, and provides an interface from various applications such as image processor 1022 to components of computing device 1000. For example, operating system 1016, in one example, facilitates the communication of various applications such as image processor 1022 with processors 1002, communication unit 1010, storage device 1012, input device 1006, and output device 1008. Applications such as image processor 1022 may include program instructions and/or data that are executable by computing device 1000. As one example, image processor 1022 may implement a signal processing and/or filtering architecture 1024 to perform image processing tasks or rendered image de-noising tasks such as those described above, which in a further example comprises using signal processing and/or filtering hardware elements such as those described in the above examples. These and other program instructions or modules may include instructions that cause computing device 1000 to perform one or more of the other operations and actions described in the examples presented herein.

Features of example computing devices in FIGS. 9 and 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112(f) so that it is specifically intended that 35 USC § 112(f) not be implicated by use of the term "computing device," "processor," "processing unit," "processing circuit" and/or similar terms; however, if it is determined, for some reason not immediately apparent, that the foregoing understanding cannot stand and that 35 USC § 112(f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 and in the text associated with the foregoing figure(s) of the present patent application.

The term electronic file and/or the term electronic document, as applied herein, refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format).

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method comprising:

obtaining a first image in a first resolution format comprising image signal intensity values mapped to first pixel locations, image signal intensity values being offset from the first pixel locations according to associated jitter vectors; and mapping the image signal intensity values to second pixel locations in a second image in a second resolution format based at least in part on the jitter vectors, the second resolution format being higher resolution than the first resolution format, the second pixel locations in the second image having associated upsampled jitter vectors based, at least in part, on a difference between the mapped second pixel locations and second image pixel centers corresponding to the second pixel locations.

2. The method of claim 1, and further comprising:

combining the mapped image signal intensity values with image signal intensity values of a warped history image frame according to coefficients predicted by a neural network.

3. The method of claim 2, wherein the warped history image frame has the same resolution as the second resolution format.

4. The method of claim 2, and further comprising combining the mapped image signal intensity values with the image signal intensity values of the warped history image frame further based on magnitudes of the upsampled jitter vectors.

5. The method of claim 1, wherein the second image comprises a sparse image frame.

6. The method of claim 5, and further comprising interpolating between and/or among image signal intensity values mapped to second pixel locations neighboring a null pixel location in the sparse image frame and image signal intensity values of a warped history image frame to determine one or more image signal intensity values to be mapped to the null pixel location.

7. The method of claim 1, wherein the first resolution format is mapped to the second resolution format according to a non-integer scale factor.

8. The method of claim 1, wherein mapping the image signal intensity values further comprises mapping image signal intensity values for at least one pixel location in the first image to one of a plurality of pixel locations in the second image corresponding to a pixel location in the first image using a jitter vector of the at least one pixel location in the first image.

9. The method of claim 1, wherein the first image comprises a rendered image frame and the second image comprises a displayed image frame.

10. The method of claim 2, further comprising combining the image signal intensity values from the second image and image signal intensity values of the warped history image frame to generate an output image frame.

11. A computing device, comprising:

a memory comprising one more storage devices; and one or more processors coupled to a memory, the one or more processors operable to, for at least one image:

obtain a first image in a first resolution format comprising image signal intensity values mapped to first pixel locations, image signal intensity values being offset from the first pixel locations according to associated jitter vectors; and map the image signal intensity values to second pixel locations in a second image in a second resolution format based at least in part on the jitter vectors, the second resolution format being a higher resolution than the first resolution format, the second pixel locations in the second image having associated upsampled jitter vectors based, at least in part, on a difference between the mapped second pixel locations and second image pixel centers corresponding to the second pixel locations.

12. The computing device of claim 11, wherein the one or more processors are further operable to:

combine the mapped image signal intensity values with image signal intensity values of a warped history image frame according to coefficients predicted by a neural network.

13. The computing device of claim 12, wherein the one or more processors are further operable to combine the mapped image signal intensity values with the image signal intensity values of the warped history image frame further based on magnitudes of the upsampled jitter vectors.

14. The computing device of claim 11, wherein the second image comprises a sparse image frame.

15. The computing device of claim 14, wherein the one or more processors are further operable to interpolate between and/or among image signal intensity values mapped to second pixel locations neighboring a null pixel location in the sparse image frame and image signal intensity values of a warped history image frame to determine one or more image signal intensity values to be mapped to the null pixel location.

16. The computing device of claim 11, wherein the first resolution format is mapped to the second resolution format according to a non-integer scale factor.

17. The computing device of claim 11, wherein the one or more processors are further operable to map image signal intensity values for at least one pixel location in the first image to one of a plurality of signal intensity values in the second image corresponding to a image signal intensity value in the first image using a jitter vector of the image signal intensity value in the first image.

18. The computing device of claim 11, wherein the first image comprises a rendered image frame and the second image comprises a displayed image frame.

19. The computing device of claim 12, wherein the one or more processors are further operable to combine the image signal intensity values from the second image with image signal intensity values of the warped history image frame to generate an output image frame.

20. A method of training a neural network, comprising:

receiving an input tensor in an input layer of a neural network, the input tensor representing one or more characteristics of an image;

providing an output tensor to an output layer of the neural network, the output tensor representing one or more coefficients to determine proportions of mapped image signal intensity values to be combined with image signal intensity values of a warped history image, the mapped image signal intensity values comprising a first image comprising image signal intensity values offset from first pixel locations in a first resolution format according to associated jitter vectors mapped to second pixel locations in a second image in a second resolution format based at least in part on the jitter vectors, the second resolution format being higher resolution than the first resolution format and the second pixel locations in the second image having associated upsampled jitter vectors based, at least in part, on a difference between the mapped second pixel locations and second image pixel centers corresponding to the second pixel locations, the output layer of the neural network connected by one or more intermediate layers of the neural network; and training the neural network to predict the provided output tensor based on the received input tensor by using backpropagation to adjust a weight of one or more activation functions linking one or more nodes of one or more layers of the neural network.

* * * * *